(12) United States Patent  
Walston

(10) Patent No.: US 7,712,773 B2
(45) Date of Patent: May 11, 2010

(54) CINCH RING FOR TIGHTENING TETHERS OF AN INFLATABLE AIRBAG

(75) Inventor: Bryan Walston, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 362 days.

(21) Appl. No.: 11/593,230

(22) Filed: Nov. 6, 2006

(65) Prior Publication Data

US 2008/0106083 A1    May 8, 2008

(51) Int. Cl.
*B60R 21/213*    (2006.01)
*B60R 21/23*    (2006.01)

(52) U.S. Cl. .................. 280/730.2; 280/743.2; 280/749
(58) Field of Classification Search ............. 280/728.2, 280/730.2, 743.1, 743.2, 749
See application file for complete search history.

(56) References Cited

U.S. PATENT DOCUMENTS

| | | | |
|---|---|---|---|
| 3,687,485 A | 8/1972 | Campbell | |
| 5,322,322 A | 6/1994 | Bark et al. | |
| 5,480,181 A | 1/1996 | Bark et al. | |
| 6,095,551 A * | 8/2000 | O'Docherty | 280/730.2 |
| 6,152,481 A | 11/2000 | Webber et al. | |
| 6,224,091 B1 | 5/2001 | Eyrainer et al. | |
| 6,237,939 B1 * | 5/2001 | Resh | 280/730.2 |
| 6,464,250 B1 * | 10/2002 | Faigle et al. | 280/730.2 |
| 6,474,681 B2 * | 11/2002 | Peer et al. | 280/730.2 |
| 6,505,853 B2 * | 1/2003 | Brannon et al. | 280/730.2 |
| 6,517,110 B1 | 2/2003 | Butters et al. | |
| 6,676,154 B2 | 1/2004 | Fischer | |
| 6,695,342 B2 | 2/2004 | Tanase et al. | 280/730.2 |
| 6,709,008 B2 | 3/2004 | McGee et al. | |
| 6,709,010 B2 * | 3/2004 | Dominissini et al. | 280/730.2 |
| 6,773,031 B2 | 8/2004 | Haig | |
| 6,793,239 B2 | 9/2004 | Feldman et al. | |
| 6,966,579 B2 | 11/2005 | Schneider et al. | 280/743.2 |
| 6,994,371 B2 * | 2/2006 | Bossecker et al. | 280/730.2 |
| 7,125,069 B2 | 10/2006 | Cacucci et al. | |
| 2001/0033073 A1 | 10/2001 | Hammond et al. | |
| 2005/0082797 A1 | 4/2005 | Welford et al. | |
| 2008/0106072 A1 | 5/2008 | Walston | |

FOREIGN PATENT DOCUMENTS

GB    EP 1 264 742    2/2005

OTHER PUBLICATIONS

Notification of Transmittal of the International Search Report and the Written Opinion of the International Searching Authority issued Sep. 24, 2008 in International Application No. PCT/US2007/082189.

(Continued)

*Primary Examiner*—Paul N. Dickson
*Assistant Examiner*—George D. Spisich
(74) *Attorney, Agent, or Firm*—Sally J Brown; Stoel Rives LLP

(57) ABSTRACT

An airbag device for use in a motor vehicle. The airbag device includes an inflatable curtain and a cinch ring for tightening a tether during the inflation of the inflatable curtain.

14 Claims, 8 Drawing Sheets

OTHER PUBLICATIONS

Premilinary Amendment filed Nov. 28, 2008 in Co-Pending U.S. Appl. No. 11/593,281.
Office Action issued Dec. 26, 2008 in co-pending U.S. Appl. No. 11/593,281.
Amendment and Response to Office Action filed Apr. 27, 2009 in co-pending U.S. Appl. No. 11/593,281.
Final Office Action issued Aug. 20, 2009 in co-pending U.S. Appl. No. 11/593,281.
Amendment After Final filed Aug. 26, 2009 in co-pending U.S. Appl. No. 11/593,281.
Notice of Allowance and Fee(s) Due issued Sep. 14, 2009 in co-pending U.S. Appl. No. 11/593,281.

* cited by examiner

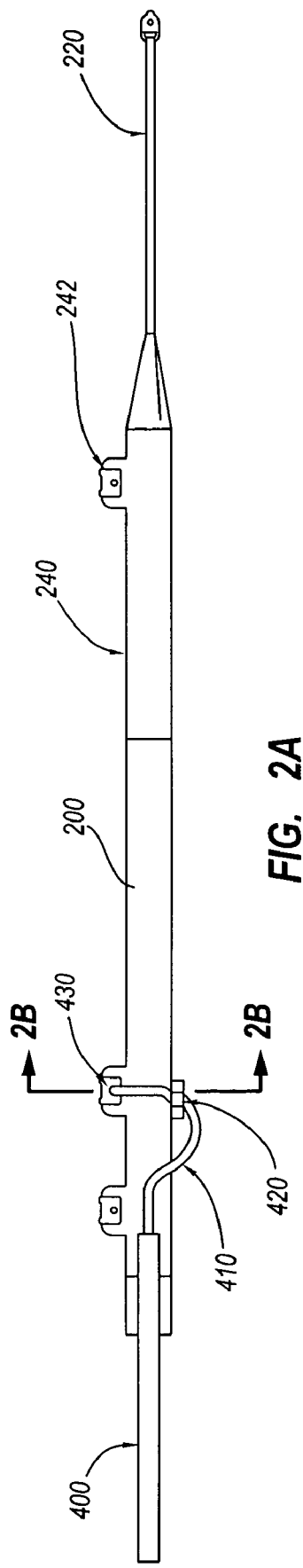
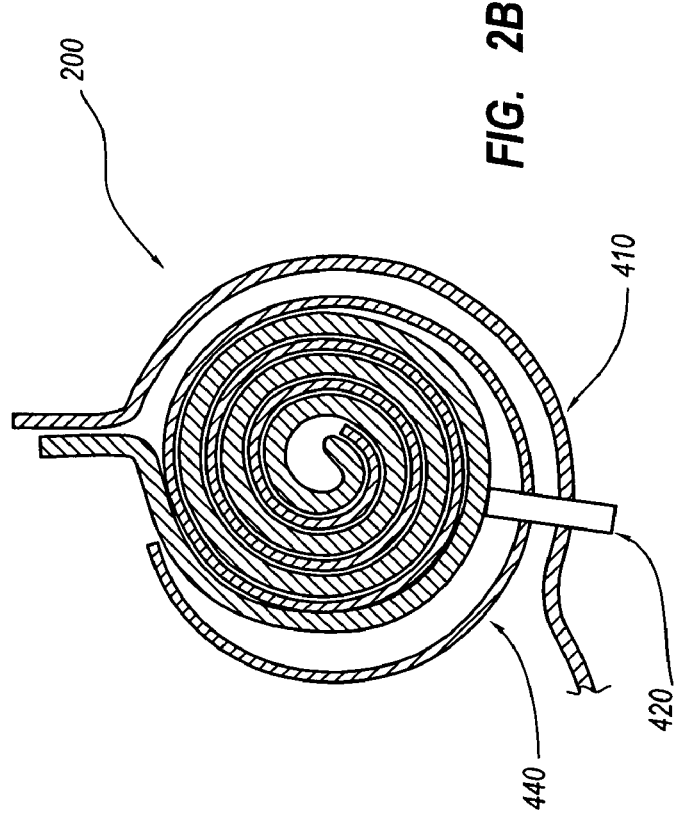
FIG. 2A
FIG. 2B

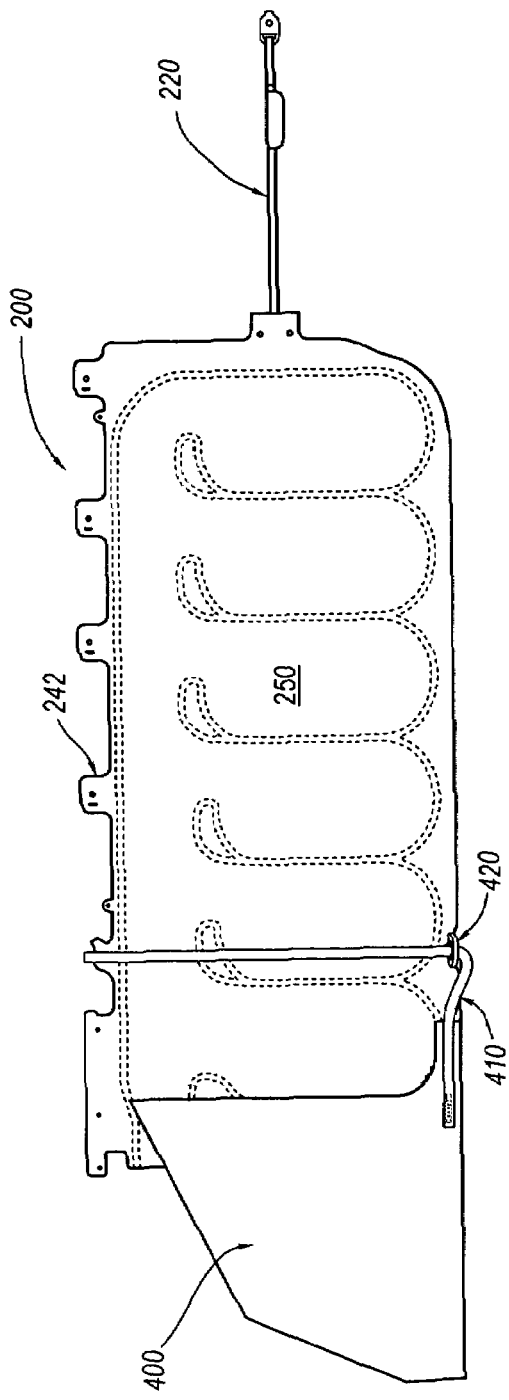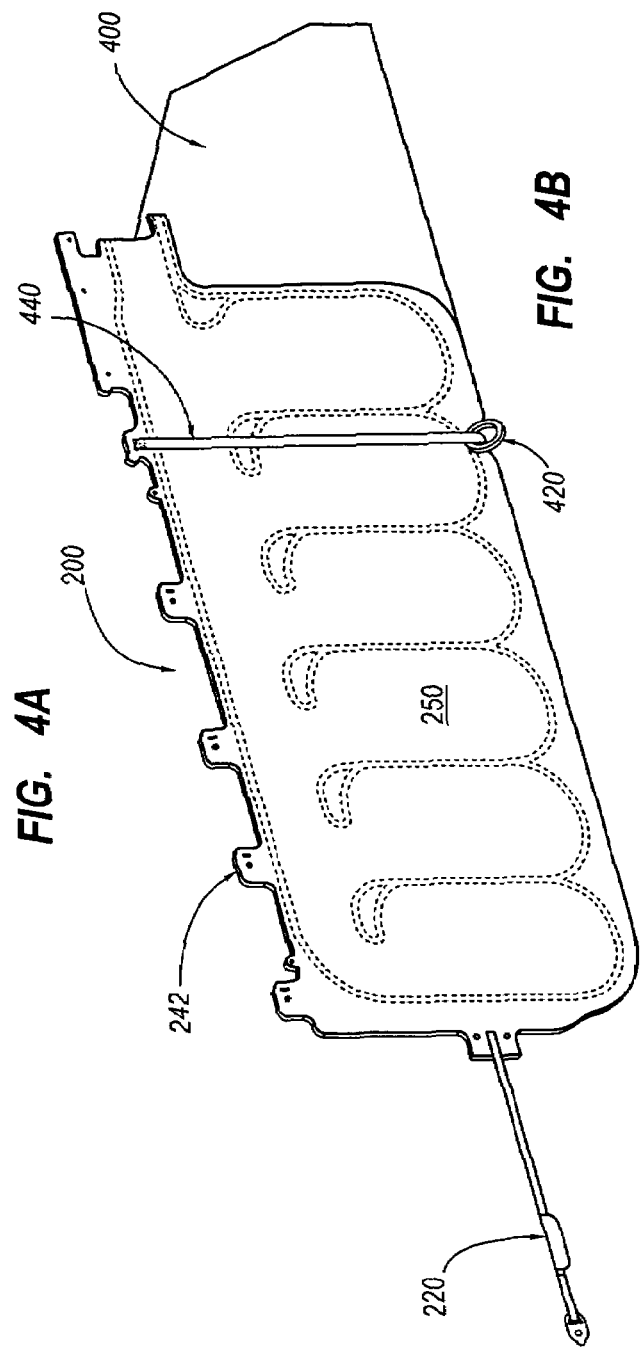
FIG. 4A
FIG. 4B

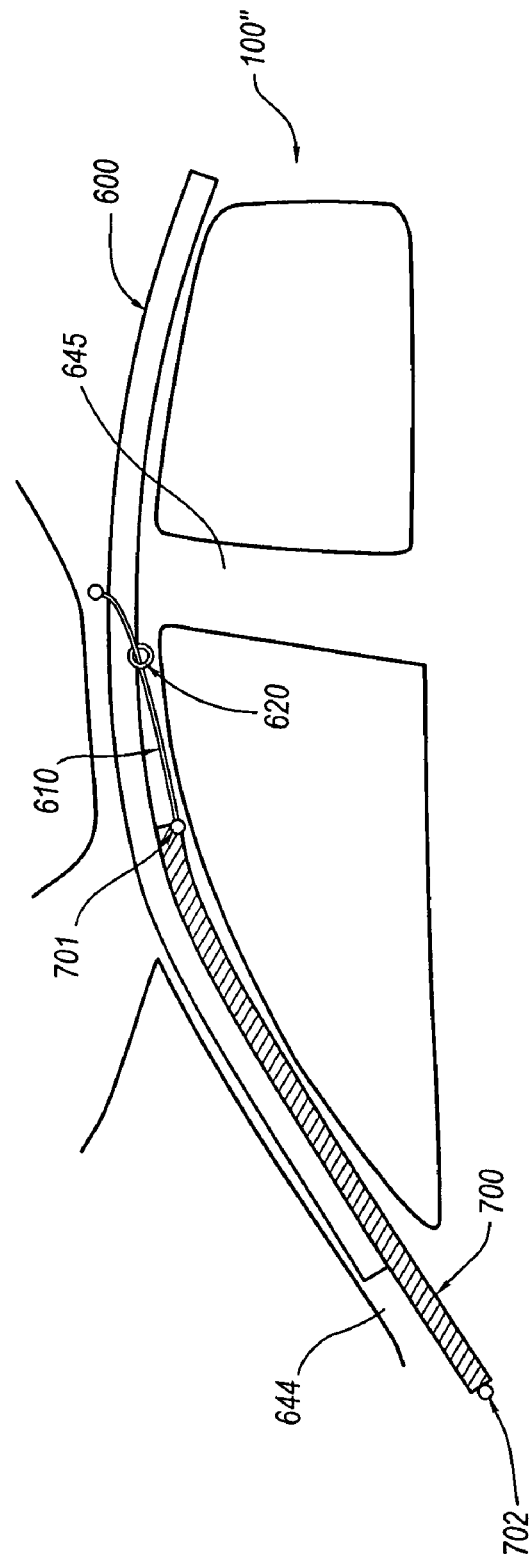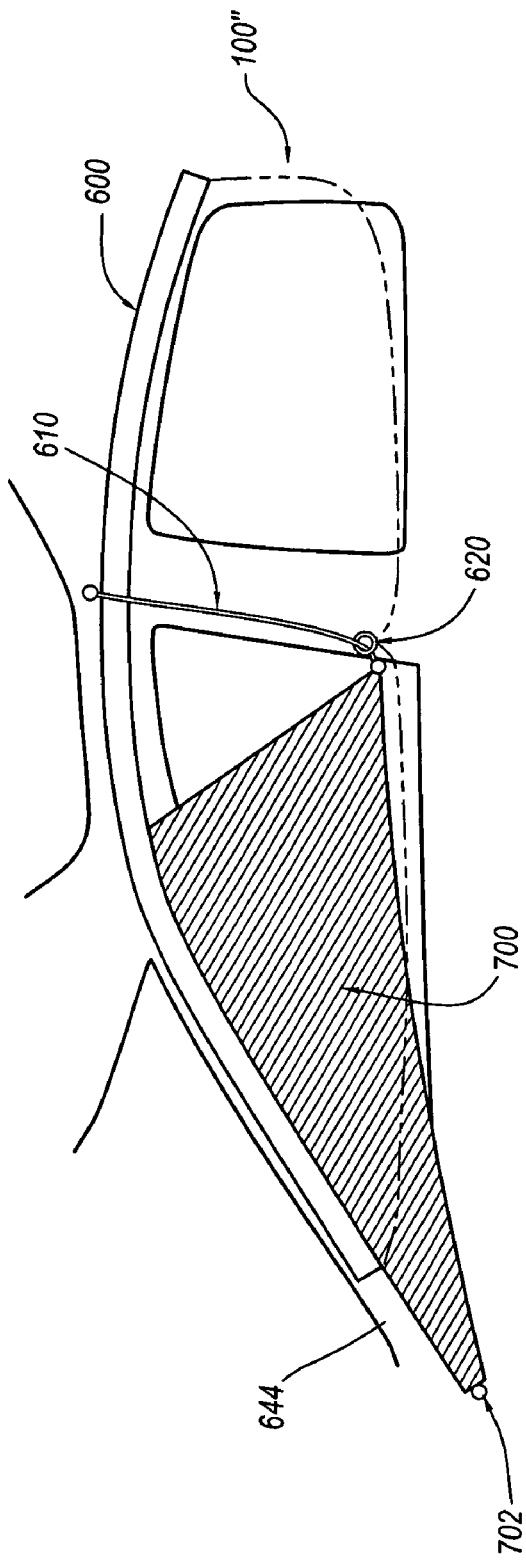

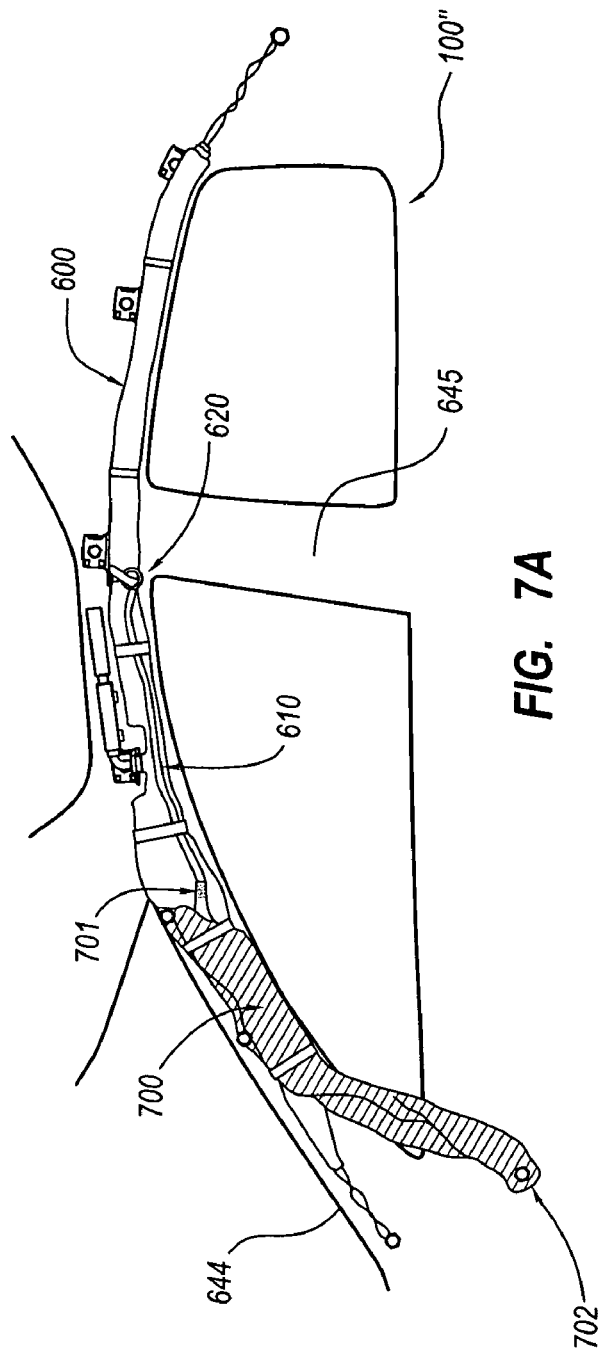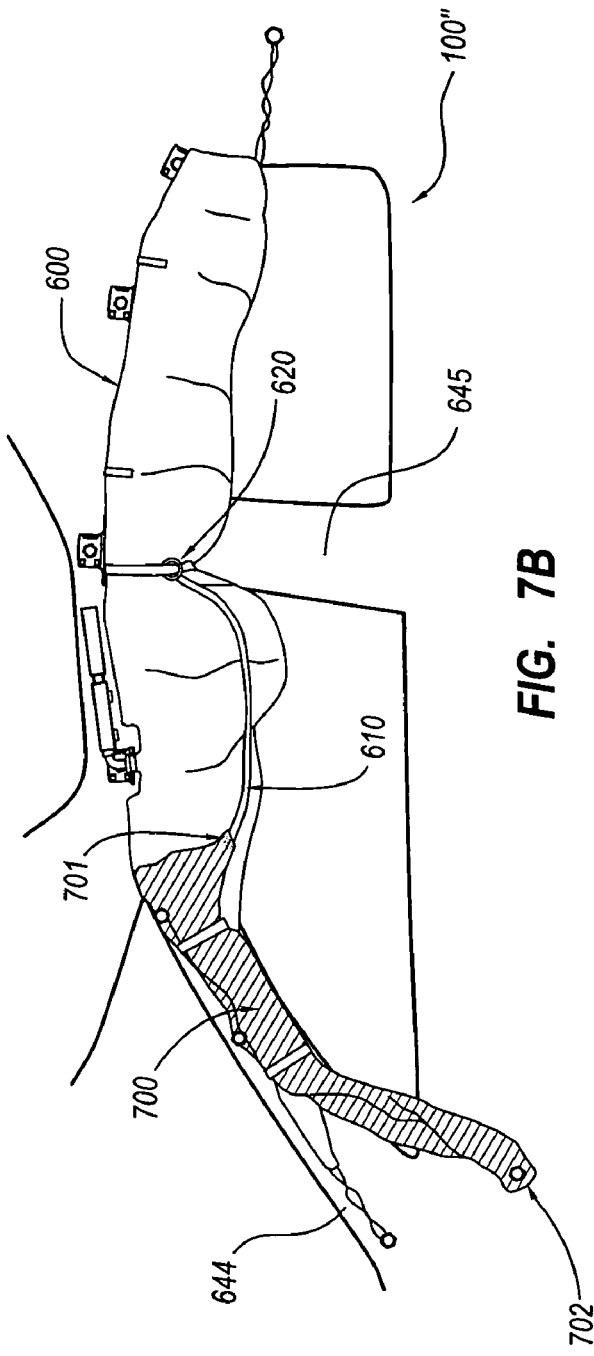

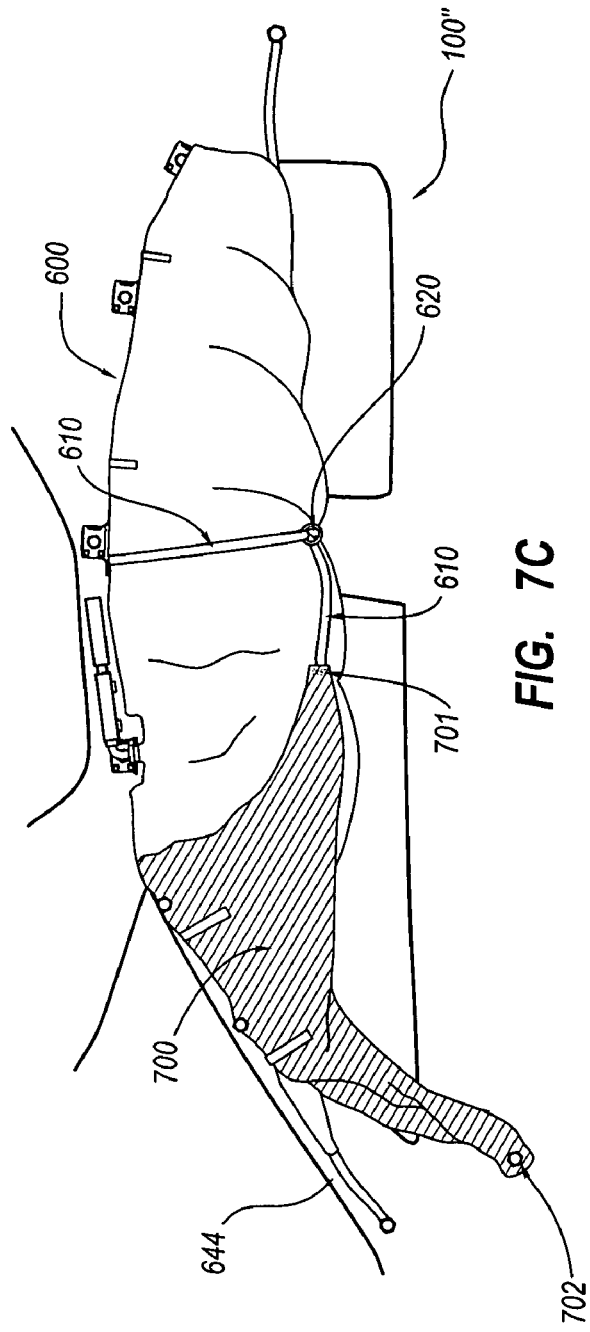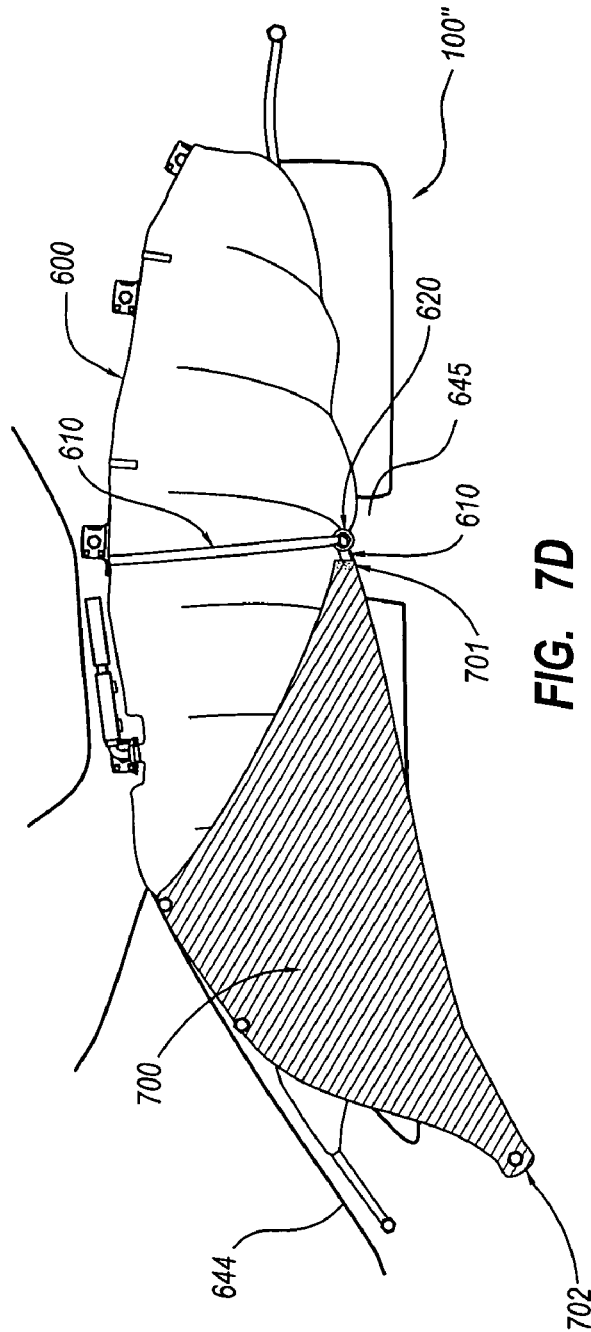

CINCH RING FOR TIGHTENING TETHERS OF AN INFLATABLE AIRBAG

TECHNICAL FIELD

The present disclosure relates generally to the field of automotive protective systems. More specifically, the present disclosure relates to the deployment of passenger airbag systems.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

FIG. 2A is a side view of one embodiment of an inflatable curtain in a stored state.

FIG. 2B is a side cross-sectional view of an inflatable curtain in a stored state as shown in FIG. 2A.

FIG. 4A is an inboard side view of an alternative embodiment of an inflatable curtain.

FIG. 4B is an outboard side view of the inflatable curtain as show in FIG. 4A.

FIG. 6A is a is a side view of yet another embodiment of an inflatable curtain in a stored state mounted inside a vehicle.

FIG. 6B is a side view of the inflatable curtain as shown in FIG. 6A in a deployed state.

FIG. 7A is a side view of an inflatable side curtain and an ejection mitigation panel mounted on the roof rail of a vehicle.

FIG. 7B is a side view of the partially deployed inflatable side curtain of FIG. 7A.

FIG. 7C is side view of the deployed inflatable side curtain of FIG. 7A and the partially deployed ejection mitigation panel of FIG. 7A.

FIG. 7D is a photograph of the fully deployed inflatable side curtain and the fully deployed ejection mitigation panel of FIG. 7A.

Figure 1:
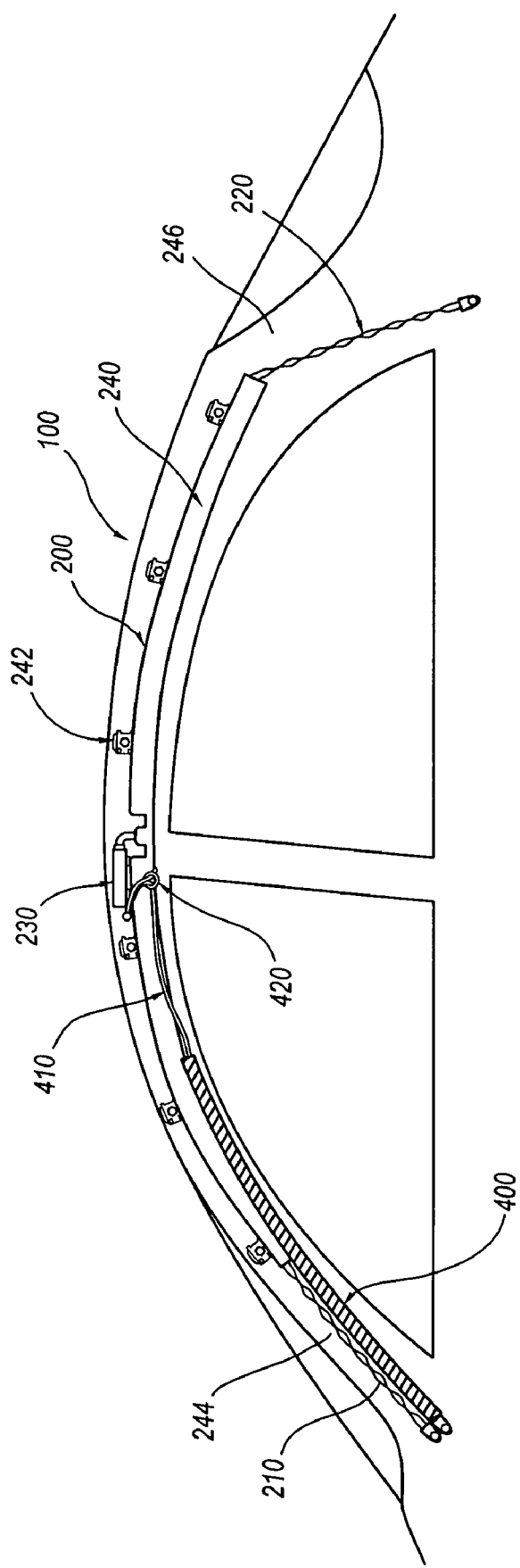
FIG. 1 is a side view from of one embodiment of an inflatable curtain in a stored state mounted inside a vehicle.

INDEX OF ELEMENTS IDENTIFIED IN THE DRAWINGS 100 vehicle
100' vehicle
100" vehicle
200 inflatable curtain
210 first tether
220 second tether
230 inflator
240 inflatable curtain wrap
242 attachment clips
244 A-pillar
246 B-pillar
250 inflatable zone
400 ejection mitigation panel
410 deployment tether
412 tether point A
420 cinch ring
430 tether attachment point
440 guide strap
500 inflatable curtain
510 tether
511 tether
512 guide strap
513 guide strap
514 lower attachment point
515 lower attachment point
516 upper attachment point
517 upper attachment point
520 cinch ring
521 cinch ring
530 inflatable zone
540 window
600 inflatable side curtain
610 tether
620 cinch ring
644 A-pillar
645 B-pillar
700 tethered ejection mitigation panel
701 tether attachment point
702 ejection mitigation panel attachment point

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in drawings, the drawings are not necessarily drawn to scale unless specifically indicated.

As those of skill in the art will appreciate, the pringples of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

With reference now to the accompanying figures, particular embodiments will now be described in greater detail. Referring to FIG. 1, an airbag device for use in a motor vehicle may include at least one inflatable curtain 200, shown in an undeployed state disposed within a motor vehicle 100. The inflatable curtain 200 may be mounted on or near a roof rail inside the vehicle 100. The inflatable curtain 200 may also include an inflator 230 that may contain a stored quantity of pressurized inflation fluid or a combination of pressurized inflation fluid and ignitable material for heating the inflation fluid. Alternatively, the inflator 230 may be a pyrotechnic inflator that uses the combustion of gas-generating material to generate the inflation gas.

The inflatable curtain 200 may be housed inside a wrap 240 and may be mounted to the vehicle 100 by attachment clips 242. The inflatable curtain 200 may extend from the A-pillar 244 to the C-pillar 246 in the vehicle 100. In alternative embodiments, the inflatable curtain 200 may extend from the A-pillar 244 to a D-pillar in larger A-D vehicles such as vans and large sport utility vehicles.

A first tether 210 may be attached to the inflatable curtain 200 approximately adjacent to the A-pillar 244 and the first tether 210 can be attached to the vehicle 100. A second tether 220 may be attached to the inflatable curtain 200 at or approximately adjacent to the B-pillar 244 and the second tether 220 can be attached to the vehicle 100.

As shown in FIG. 2A, one example of the inflatable curtain 200 may comprise a deployment tether 410 and a cinch ring 420. A cinch ring as disclosed herein may be formed out of metal, plastic, fabric or other suitable material and configured like a round ring or any other shape or configuration that will function as described herein. As seen in FIG. 2B, a cross section of the inflatable curtain 200 in an undeployed state, the inflatable curtain 200 may comprise a guide strap 440 encircled by the cinch ring 420 and attached to the inflatable curtain 200 (FIG. 4B). The cinch ring 420 may be configured so that it can slide freely along the guide strap 440. When the inflatable curtain 200 is in the undeployed state, the cinch ring 420 may be positioned near the top of the guide strap 440 and outside of the folded inflatable curtain 200 so that the deployment tether 410 may be threaded through the cinch ring 420. In yet another example, the cinch ring 420 may also be directly attached to the bottom of the folded inflatable curtain 200 thus allowing the deployment tether 410 to be threaded through the cinch ring 420. As shown by FIG. 2A, the deployment tether 410 may be attached to the vehicle at a tether attachment point 430.

Referring to FIG. 4B, as the inflatable curtain 200 deploys, the cinch ring 420 is pulled downward. This downward motion of the cinch ring 420 may be used to tension the deployment tether 410 and deploy other components of an airbag system.

The guide strap 440 may be attached at a first point at or near the top of the inflatable curtain 200 and also attached at a second point that would be typically, but not limited to, a point below the first point at or near the bottom of the inflatable curtain 200. In one embodiment, the cinch ring 420 is not attached to the inflatable curtain 200, the deployment tether 410, or the guide strap 440, but is free to slide on the guide strap 440 during the expansion of the inflatable curtain 200.

Figures 3A, 3B, 3C:
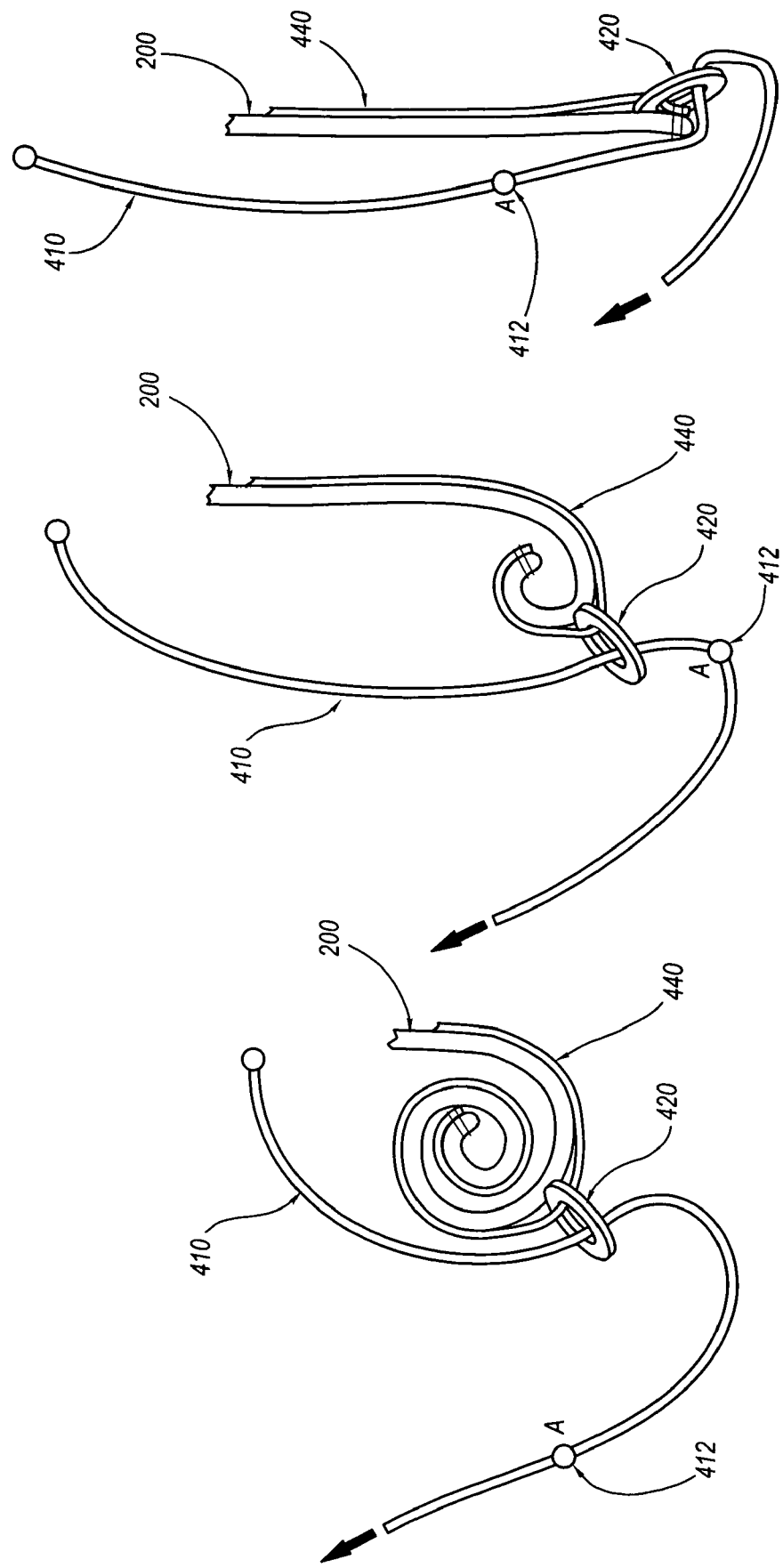
FIG. 3A is a side cross-sectional view of an alternate embodiment of an inflatable curtain in a stored state.
FIG. 3B is a side cross-sectional view of an inflatable curtain in a partially deployed state.
FIG. 3C is a side cross-sectional view of an inflatable curtain in a fully deployed state.

Referring to FIG. 3A through FIG. 3C, the inflation of the inflatable curtain 200 may cause the cinch ring 420 to slide along the guide strap 440 and to simultaneously create tension in the encircled deployment tether 410. In FIG. 3A the cinch ring 420 encircles the deployment tether 410 at a location distant from the point A, as indicated by reference numeral 412. FIG. 3B shows a partially deployed inflatable curtain 200 and, as the inflatable curtain 200 deploys, the force exerted by the expanding inflatable curtain 200 moves the cinch ring 420 down the guide strap 440 while simultaneously tensioning the deployment tether 410 as it slides through the cinch ring 420. Accordingly, the point A indicated by reference number 412 on the deployment tether 410, may move closer to the cinch ring 420.

As shown in FIG. 3C and FIG. 4B, when the inflatable curtain 200 is fully deployed, the cinch ring 420 will have moved on the strap 440 to the bottom of the inflatable curtain 200. The downward movement of the cinch ring 420 may be employed to pull and tension the deployment tether 410. In this manner, the inflation of the inflatable curtain 200 and the accompanying movement of the cinch ring 420 may allow the tether 410 to be tightened without any additional mechanism such as a pulley, ratchet, or pyrotechnic pre-tensioner.

In yet another embodiment, the cinch ring 420 may be attached directly to the bottom of the inflatable curtain 200. Accordingly, when the inflatable curtain 200 is deployed, the cinch ring 420 will move downward and tighten the deployment tether 410.

Referring to FIG. 2A, the inflatable curtain 200 can be associated with an ejection mitigation panel ("EJM") 400. As an example only, and not meant as a limitation, the deployment tether 410 may be attached to the EJM 400 at one end and attached at the other end to the inflatable curtain 200 or the inside of the vehicle 100 at the tether attachment point 430. With the deployment tether 410 attached to the EJM 400, the inflation of the inflatable curtain 200 will cause the cinch ring 420 to be pulled downward thus tightening the deployment tether 410 and deploying the EJM 400.

As shown in FIG. 4A, the inflatable cuurtain 200 may have an inflatable zone 250 that provides impact protection for a vehicle passenger. However, the vehicle may have window openings that are not completely covered by the inflatable zone 250. The EJM 400 can be configured to cover the window openings that are not covered by the inflatable curtain 200 in order to keep the passenger's limbs, head, and body within the vehicle 100.

In one embodiment, the EJM 400 may be constructed of a woven fabric such as a nylon fabric, or a non-woven sheet. In an alternative embodiment, the EJM 400 may be constructed of netting, webbing, mesh, or other textile materials. The EJM 400 can be inflatable and cushioning with the inflatable curtain 200. On the other hand, the EJM 400 does not necessarily inflate with the inflatable curtain 200. The EJM 400 may be stored separately from the inflatable curtain 200. Alternatively, the EJM 400 may be rolled and housed together with the inflatable curtain 200 inside the wrap 240.

Figure 5:
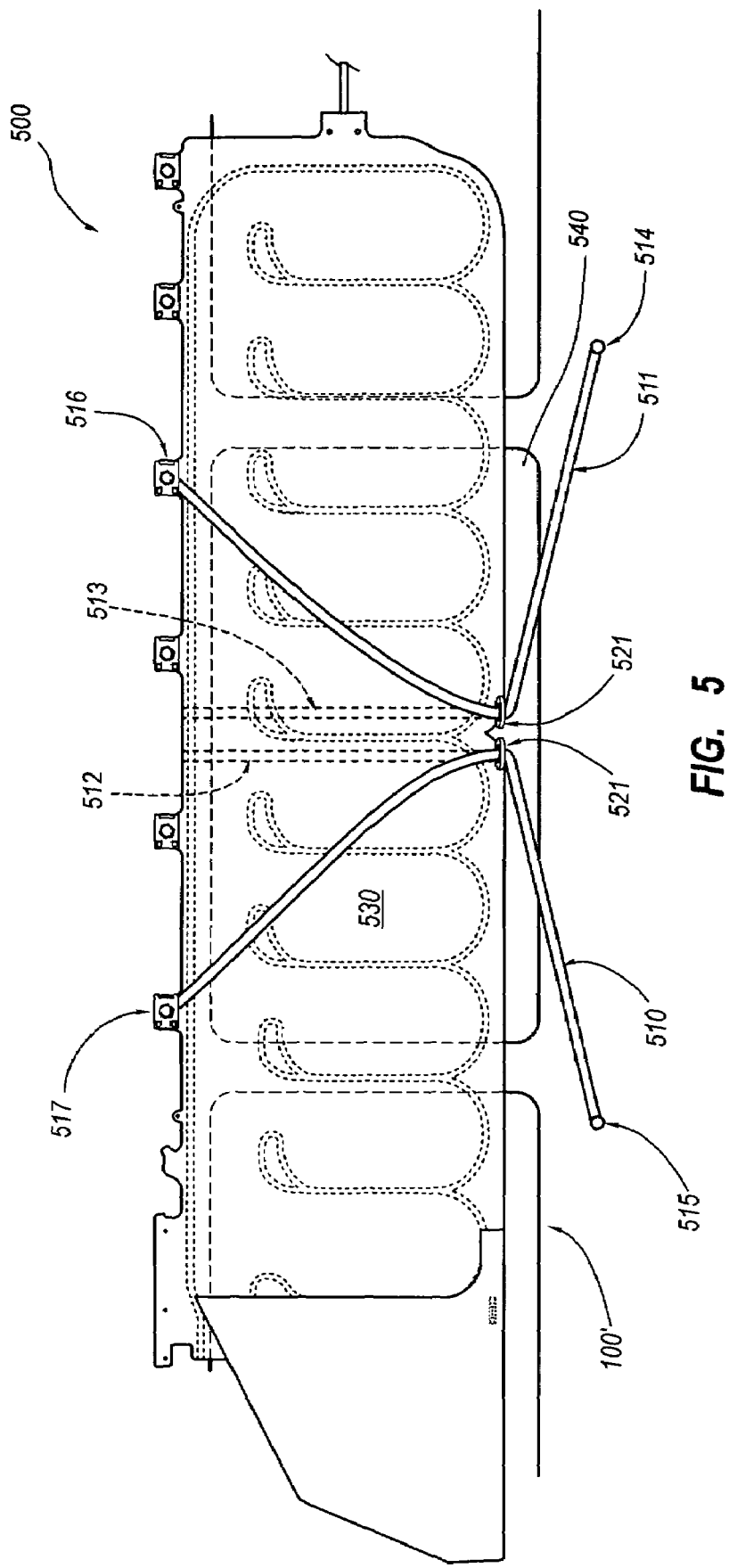
FIG. 5 is an inboard side view if an alternative embodiment of a deployed inflatable curtain.

In yet another embodiment as shown by FIG. 5, an inflatable curtain 500 may be attached to the roof rail of a vehicle 100' and extend from the A-pillar to a D-pillar in larger A-D vehicles such as a vans and sport utility vehicles. The inflatable zone 530 of the inflatable curtain 500 may substantially cover a window 540 of the vehicle 100' and cushion the passengers from contact with the window 540 and the inside of the vehicle 100'. In the event of a collision or rollover accident the window 540 may be compromised and allow the inflatable zone 530 to protrude from the window 540. When the inflatable zone 530 is compromised and moved out of position, it is less likely that the inflatable curtain 500 will keep the passenger's limbs, head, and body within the vehicle 100'.

With reference to FIG. 5, the integrity of the inflatable zone 530 of the inflatable curtain 500 may be maintained by one or more tethers such as the tethers 510 and 511 which may prevent the inflation zone 530 from protruding from the vehicle 100'. In one embodiment, the tethers 510 and 511 may be attached at the lower attachment points 514 and 515, preferably at points below the belt line of the car. The tethers 510 and 511 may also be attached to the upper attachments points 516 and 517. In an undeployed state, the tethers 510 and 511 may be routed from the lower attachment points 514 and 515, through the cinch rings 520 and 521, and to the upper attachment points 516 and 517 and stored in the pillars and roof rail of the vehicle 100'.

Upon deployment of the inflatable curtain 500, the tethers 510 and 511 may be activated or tightened by the downward movement of the cinch rings 520 and 521. As shown in FIG. 5, the guide strap 512 and the guide strap 513 can be attached to the inflatable curtain 500 and threaded through the cinch rings 520 and 521. Upon inflation of the inflatable curtain 500, the cinch rings 520 and 521 may move down the guide straps 512 and 513, as shown by FIGS. 3A-3C. As the cinch rings 520 and 521 move down the guide straps 512 and 513, the tethers 510 and 511 are activated or tightened by removing the slack from the tethers 510 and 511. When the inflatable curtain 500 is fully deployed, the tension in the tethers 510 and 511 serves to tether the inflatable curtain 500 and prevent the bottom edge of the inflated zone 530 from swinging through the window.

In yet another embodiment, the inflatable curtain 500 may have an inflatable zone 530 along with other non-inflatable areas surrounding or extending from the inflatable zone 530. The non-inflatable areas may extend below and beyond the edges of the window 540 and even extend far below the beltline of the vehicle as an ejection mitigation measure. The non-inflatable areas of the inflatable curtain 500 may be secured in place by one or more tethers that are activated or tightened by cinch rings in a manner such as that discussed previously. In this way, the inflatable zone 530 need not extend below the vehicle beltline thus, avoiding the increased costs and complexity of bigger inflatable curtains, larger inflators, and increased packaging space.

In another embodiment shown in FIGS. 6A-6B, a tethered ejection mitigation panel ("EJM") 700 may deployed by the activation of an inflatable side curtain 600. With particular reference to FIG. 6A, the inflatable side curtain 600 in the undeployed state may be stored in the roof rail of the vehicle 100" and extend from approximately adjacent to the A-pillar 644 to at least the B-pillar 645 and may even extend beyond to a C-pillar or a D-pillar in larger vehicles. The inflatable side curtain 600 may include a guide strap (not shown) that is attached to the back, or outboard side of the inflatable side curtain 600, that may allow a cinch ring 630 to slide from the top to the bottom of the inflatable side curtain 600. In one embodiment, the guide strap may be attached to the inflatable side curtain 600 at a location at or adjacent to the B-pillar 645 thus, localizing the cinch ring 620 at or adjacent to the top of the B-pillar when the inflatable side curtain 600 is in the undeployed state.

With reference to FIG. 6A, the inflatable side curtain 600 may also comprise a tether 610 that is first threaded through the cinch ring 630, with one end being attached above the inflatable side curtain 600 and the other end being attached to the EJM 700. For example, as shown in FIG. 6B, one end of the tether 610 may be attached to the roof rail of vehicle 100" at approximately adjacent to the top of the B-pillar. The tether 610 is then threaded through the cinch ring 620 with the length of the tether 610 being stored along the roof rail and the end thereof being attached to the end of the EJM 700 at the tether attachment point 701.

In still another embodiment, meant as a non-limiting example, FIGS. 7A through 7D show the use of a tethered ejection mitigation panel that is deployed using tethers and a cinch ring. More particularly, when the inflatable side curtain 600 is deployed it pulls the cinch ring 620 to the bottom of the inflatable side curtain 600 while simultaneously tightening the tether 610 through the cinch ring 620 so that the slack in the tether 610 is taken up and the EJM 700 is deployed.

FIG. 7A shows the inflatable side curtain 600 in the undeployed state and secured to the roof rail of vehicle 100". The EJM 700 may be a separate non-inflatable panel that is not directly attached to the inflatable side curtain 600. Further examples of non-integral ejection mitigation panels may be found in U.S. patent application Ser. No. 11/593,281, filed Nov. 6, 2006 (Ejection Mitigation Panel). FIG. 7A shows that the cinch ring 620 is visible outside of the folded inflatable side curtain 600. Threaded through the cinch ring 620 is a guide strap (not shown) that will direct the downward movement of the cinch ring 620 during the inflation of the inflatable side curtain 600. It is also contemplated that the cinch ring 620 may be attached directly to the bottom edge of the inflatable side curtain 600 such that when the inflatable side curtain 600 is folded and stored the cinch ring 620 remains accessible by the tether 610. Also threaded through the cinch ring 620 is the tether 610 of which one end is attached above the inflatable side curtain 600 and the other end is attached to the end of the EJM 700. Also shown in FIG. 7A is the attachment off the EJM 700 at the ejection mitigation panel attachment point 702 located below the belt line at the front corner of the window opening of vehicle 100".

Referring to FIG. 7B, as the inflatable side curtain 600 is deployed it begins to unfold and the cinch ring 620 is pushed downwards by the force of the inflation. Furthermore, as the cinch ring 620 moves downward it puts tension on the tether 610 which starts stretching or pulling the tether 610.

Progressing to FIG. 7C, continued inflation of the inflatable side curtain 600 causes the cinch ring 620 to tighten the tether 610. As the slack in the tether is taken up, the tether begins deploying the EJM 700. As can be seen in FIG. 7C, the bottom edge of the EJM 700 is unfolding as the tether 610 pulls on the end of the EJM 700.

Referring to FIG. 7D, when the inflatable side curtain 600 is fully deployed, the cinch ring 620 is pushed to the bottom of the inflatable side curtain 600 and all the slack from the tether 610 is taken up by the downward movement of the cinch ring 620. Accordingly, the end of the EJM 700 is pulled by the tether 610 towards the back of the window until the EJM 700 is fully deployed. In this way, the EJM 700 is unfolded by the tether 610 and positioned over the corner of the window that is not covered by the inflatable side curtain 600.

Various embodiments for deploying ejection mitigation panels have been disclosed herein. The cinch rings and the tethers that may be used for tightening tethers attached to an ejection mitigation panel are examples of means for deploying an ejection mitigation panel. Also disclosed herein are various embodiments of tethering an inflatable curtain so that the bottom edge of the inflatable curtain will not be free to swing through the window. The cinch rings configured to slide along a guide strap for the purposes of tensioning one or more tethers are examples of means for tethering an inflatable curtain.

It will be obvious to those having skill in the art that many changes may be made to the details of the above-described embodiments without departing from the underlying pringples of the invention. The scope of the present invention should, therefore, be determined only by the following claims.

The invention claimed is:

1. An airbag device for use in a motor vehicle, the airbag device comprising:
   at least one inflatable curtain comprising at least one guide strap and at least one cinch ring, wherein the cinch ring is configured to slide along the guide strap; and
   at least one tether threaded through the at least one cinch ring;
      wherein movement of the at least one inflatable curtain due to inflation directly causes the at least one cinch ring to slide along the at least one guide strap; and
   wherein causing the cinch ring to slide along the at least one guide strap tightens the at least one tether to prevent the at least one inflatable curtain from moving outside the motor vehicle.

2. The airbag device of claim 1, wherein the at least one tether comprises a first end configured to be attached within the vehicle above the at least one inflatable curtain and a second end.

3. The airbag device of claim 1, wherein the at least one tether comprises a first end and a second end, wherein the second end is configured to be attached within the vehicle below the inflatable curtain.

4. The airbag device of claim 1, wherein the at least one tether comprises a first end and a second end, wherein the second end is attached to the inflatable curtain.

5. The airbag device of claim 1, wherein tightening the at least one tether results in deploying an ejection mitigation panel.

6. The airbag device of claim 5, wherein the at least one ejection mitigation panel is directly attached to the at least one inflatable curtain.

7. The airbag device of claim 5, wherein the at least one tether comprises a first end and a second end, wherein the second end is attached to the ejection mitigation panel.

8. The airbag device of claim 1, wherein the at least one guide strap is attached to the inflatable curtain, wherein the at least one guide strap is wound on itself when in an undeployed state.

9. An airbag device for use in a motor vehicle comprising:
   at least one inflatable curtain comprising at least one cinch ring, wherein the cinch ring is moved by inflation of the at least one inflatable curtain;
   at least one tether threaded through the at least one cinch ring, wherein the at least one tether is tightened by moving the least one cinch ring;
      wherein tightening the at least one tether deploys at least one ejection mitigation panel; and
      wherein the at least one tether comprises a first end and a second end, wherein the first end is configured to be attached above the at least one inflatable curtain and the second end is attached to the at least one ejection mitigation panel.

10. The airbag system of claim 9, wherein the at least one cinch ring moves along at least one guide strap attached to the at least one inflatable curtain.

11. The airbag system of claim 9, wherein the at least one ejection mitigation panel is attached directly to the at least one inflatable curtain.

12. An airbag device for use in a motor vehicle, the airbag device comprising:
   at least one inflatable curtain, wherein the at least one inflatable curtain comprises at least one cinch ring;
   at least one tether that is threaded through the at least one cinch ring, wherein the at least one tether is tightened by moving the at least one cinch ring;
   at least one ejection mitigation panel attached to the at least one tether; and
      wherein tightening the at least one tether deploys the at least one ejection mitigation panel;
      wherein the at least one tether comprises a first end and a second end, wherein the first end is configured to be attached above the at least one inflatable curtain and the second end is configured to be attached to the motor vehicle below the at least one inflatable curtain.

13. The airbag device of claim 12, wherein the at least one cinch ring moves along at least one guide strap attached to the at least one inflatable curtain.

14. The airbag device of claim 12, wherein the at least one cinch ring is directly attached to the at least one inflatable curtain.

* * * * *